(12) United States Patent
Hur et al.

(10) Patent No.: US 11,478,852 B2
(45) Date of Patent: Oct. 25, 2022

(54) MICRO-NANOSTRUCTURE MANUFACTURED USING AMORPHOUS NANOSTRUCTURE AND MANUFACTURING METHOD THEREFOR

(71) Applicant: KOREA INSTITUTE OF SCIENCE AND TECHNOLOGY, Seoul (KR)

(72) Inventors: Ka Hyun Hur, Seoul (KR); Min Seok Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 7 days.

(21) Appl. No.: 17/059,214

(22) PCT Filed: Jan. 25, 2019

(86) PCT No.: PCT/KR2019/001083
§ 371 (c)(1),
(2) Date: Nov. 26, 2020

(87) PCT Pub. No.: WO2019/235713
PCT Pub. Date: Dec. 12, 2019

(65) Prior Publication Data
US 2021/0197267 A1    Jul. 1, 2021

(30) Foreign Application Priority Data

Jun. 8, 2018 (KR) .......... 10-2018-0066094
Aug. 21, 2018 (KR) .......... 10-2018-0097259

(51) Int. Cl.
*B22F 9/24* (2006.01)
*B22F 1/07* (2022.01)
(Continued)

(52) U.S. Cl.
CPC .......... *B22F 9/24* (2013.01); *B22F 1/07* (2022.01); *B22F 2301/255* (2013.01);
(Continued)

(58) Field of Classification Search
None
See application file for complete search history.

(56) References Cited

U.S. PATENT DOCUMENTS 6,592,945 B2 * 7/2003 Suzuki .......... C08K 3/01
427/386
7,160,525 B1 * 1/2007 Peng .......... C09C 1/24
423/139
(Continued)

FOREIGN PATENT DOCUMENTS

JP        2015160989 A   9/2015
KR     1020080001567 A   1/2008
(Continued)

OTHER PUBLICATIONS

English translation of JP 2015-160989 (originally published Sep. 7, 2015) obtained from Espacenet.*
(Continued)

*Primary Examiner* — George Wyszomierski
(74) *Attorney, Agent, or Firm* — Cantor Colburn LLP

(57) ABSTRACT

Disclosed are: a metal nanostructure having a diameter of 2 nm to 2.5 nm; and a manufacturing method therefor. The formed metal nanostructure is provided as approximately spherical single-crystalline nanoparticles or amorphous alloy nanoparticles. Besides, a nanostructure fabricated in the form of an oxide has a nanoneedle shape. For formation of the metal nanostructure, an amorphous nanostructure is used. A second metal element having a higher standard reduction potential than a central metal constituting the amorphous nanostructure is used in the synthesis of the metal nanostructure.

13 Claims, 10 Drawing Sheets

(51) Int. Cl.
*B82Y 30/00* (2011.01)
*B82Y 40/00* (2011.01)

(52) U.S. Cl.
CPC ......... *B22F 2304/054* (2013.01); *B82Y 30/00* (2013.01); *B82Y 40/00* (2013.01)

(56) References Cited

U.S. PATENT DOCUMENTS

| | | | | |
|---|---|---|---|---|
| 7,906,147 | B2* | 3/2011 | Hainfeld | B82Y 5/00 |
| | | | | 424/490 |
| 11,167,262 | B2* | 11/2021 | Hur | B01J 20/223 |
| 2005/0191231 | A1* | 9/2005 | Sun | B82Y 30/00 |
| | | | | 423/632 |
| 2009/0278283 | A1* | 11/2009 | Anderson | C08J 5/005 |
| | | | | 977/773 |
| 2013/0160608 | A1* | 6/2013 | Nusko | B22F 1/0547 |
| | | | | 75/370 |
| 2016/0096223 | A1* | 4/2016 | Kim | B22F 1/054 |
| | | | | 75/255 |
| 2017/0335113 | A1* | 11/2017 | Kim | C08K 3/10 |

FOREIGN PATENT DOCUMENTS

| | | |
|---|---|---|
| KR | 101322681 B1 | 10/2013 |
| KR | 101423204 B1 | 7/2014 |
| KR | 1020140143718 A | 12/2014 |
| KR | 1020150073282 A | 7/2015 |
| KR | 1020160146334 A | 12/2016 |
| KR | 1020180061034 A | 6/2018 |

OTHER PUBLICATIONS

International Search Report dated Apr. 25, 2019 for PCT/KR2019/001083.

* cited by examiner

MICRO-NANOSTRUCTURE MANUFACTURED USING AMORPHOUS NANOSTRUCTURE AND MANUFACTURING METHOD THEREFOR

TECHNICAL FIELD

The present invention relates to a nanostructure and a manufacturing method therefor, and more particularly, to a ultrasmall nanostructure formed by using a nanostructure of a metal-halide, and a manufacturing method therefor.

BACKGROUND ART

Crystalline metal nanoparticles having a ultrasmall size exhibit properties which are not possessed by large-sized nanoparticles or molecules. For example, gold (Au) nanoparticles of 3 nm or less display paramagnetic or ferromagnetic properties rather than diamagnetic properties which should be originally exhibited. Further, as the metal nanoparticles become smaller, the metal nanoparticles exhibit a photoluminescence phenomenon while a quantized band gap is generated.

Since ultrasmall nanoparticles have a much larger surface to volume ratio than large-sized nanoparticles, studies disclosing that ultrasmall nanoparticles have excellent performance in catalysts, various sensors, and the like have begun to be published. According to recent studies, it is known that ultrasmall alloyed nanoparticles have better catalytic activity than homogeneous nanoparticles.

Meanwhile, ultrasmall metal oxide particles also have different properties from the existing metal oxide particles. For example, the ferrimagnetic properties of $Fe_3O_4$ in the bulk state disappear as the size of $Fe_3O_4$ is decreased to several nm.

There are many efforts to study the properties newly generated from these ultrasmall nanoparticles or alloys and to commercialize these particles. However, to produce these ultrasmall nanoparticles, labile chemicals, strong reducing agents, and a specific surfactant need to be used. These materials are usually harmful to the human body and expensive, and the surfactant attached to the nanoparticles after the nanoparticles are produced changes the properties of the nanoparticles themselves, which make the fundamental study and application of the nanoparticles difficult. In order to expand the fields of application, a production method having a simple synthesis process and low cost is required. In addition, there is a need for synthesis in a polar solvent having no organic surfactant such that nanoparticles can be easily dispersed in water.

DISCLOSURE

Technical Problem

A first technical object to be achieved by the present invention is to provide nanoparticles having a ultrasmall size.

Further, a second technical object to be achieved by the present invention is to provide a method for manufacturing ultrasmall nanoparticles for achieving the first technical object.

Technical Solution

To achieve the above-described first technical object, the present invention provides a metal nanoparticle having a diameter size of 2 nm to 2.5 nm and including ruthenium (Ru), rhodium (Rh), palladium (Pd), silver (Ag), osmium (Os), iridium (Ir), platinum (Pt), gold (Au), cobalt (Co), sodium (Na), potassium (K), iron (Fe), cadmium (Cd), nickel (Ni), chromium (Cr), thallium (Tl), rubidium (Rb), zinc (Zn), copper (Cu), manganese (Mn), molybdenum (Mo), indium (In), gallium (Ga), bismuth (Bi), titanium (Ti), lead (Pb), aluminum (Al), magnesium (Mg) or antimony (Sb).

To achieve the above-described second technical object, the present invention provides a method for manufacturing metal nanoparticles, the method including: preparing an amorphous nanostructure in which an inorganic polymer having the following Chemical Formula 1 is hydrogen-bonded; mixing the amorphous nanostructure with a second metal precursor including a second metal element having a higher standard reduction potential than a central metal of the inorganic polymer; and forming metal nanoparticles including the second metal element inside of or on the surface of the amorphous nanostructure.

[Chemical Formula 1]

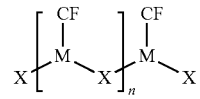

In Chemical Formula 1, M represents a transition metal, X represents a halogen element, CF represents a bonding functional group including a hydrogen element and an element for hydrogen bonding, and n is 10 to 500,000 as a number of repeat units.

Advantageous Effects

According to the present invention described above, it can be confirmed that in various preparation examples, second metal elements, which are different from a central metal of an inorganic polymer forming an amorphous nanostructure and have a higher standard reduction potential than the central metal, are formed as uniform particles having a size of 2 nm to 2.5 nm. Further, when metal nanoparticles are formed, a second metal precursor needs to be mixed at a certain concentration or more. When the concentration is insufficient, the second metal element cannot be formed into approximately spherical particles, and appears as if the second metal element adheres to or floats on the surface or in internal voids of the amorphous nanostructure.

In addition, in the present invention, metal nanoparticles having an alloy structure can be formed by mixing two or more second metal precursors having higher standard reduction potentials than the central metal. Through this, metal nanoparticles having various functions can be formed into a uniform size. Metal nanoparticles or alloy nanoparticles with a nanosize have various industrial uses. That is, various electrical or chemical properties that cannot be realized with micro-sized metal particles or metal particles having a size of tens of nanometers can be realized, and when this is applied to various environments, a very high industrial value can be obtained.

MODES OF THE INVENTION

Figure 1:
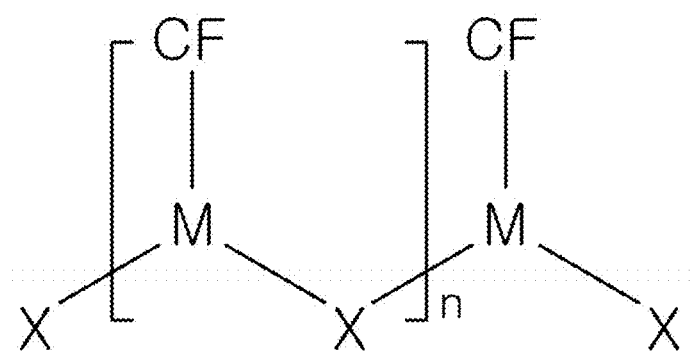
FIG. 1 is a molecular formula illustrating an inorganic polymer according to a preferred exemplary embodiment of the present invention.

Since the present invention may be modified into various forms and include various exemplary embodiments, specific exemplary embodiments will be illustrated in the drawings and described in detail herein. However, the description is not intended to limit the present invention to the specific disclosures, and it is to be understood that all the changes, equivalents and substitutions included in the spirit and technical scope of the present invention are included in the present invention. In a description of each drawing, like reference numerals are used for like constituent elements.

Unless defined otherwise, all terms used herein, including technical or scientific terms, have the same meaning as commonly understood by a person with ordinary skill in the art to which the present invention pertains. Terms such as those defined in commonly used dictionaries should be interpreted as having a meaning consistent with the meaning in the context of the relevant art and should not be interpreted as ideal or overly formal in meaning unless explicitly defined in the present application.

Hereinafter, preferred exemplary embodiments of the present invention will be described in more detail with reference to the accompanying drawings.

EXAMPLES

In the present invention, metal nanoparticles having a diameter of 2 nm to 2.5 nm are formed using an amorphous nanostructure in which inorganic polymers are hydrogen-bonded. A second metal precursor including a second metal element having a higher standard reduction potential than a central metal forming the amorphous nanostructure is introduced, and the second metal element ionized in a polar solvent is reduced. The second metal element is formed of spherical particles on the surface or void region of the amorphous nanostructure by reduction.

Further, in the reduction process of the second metal element, the oxidation number of the central metal is increased and the central metal is ionized, whereby the amorphous nanostructure is dissociated. Hereinafter, the structure of an inorganic polymer, the synthesis of an amorphous nanostructure, and the manufacture of metal nanoparticles using the amorphous nanostructure will be described.

FIG. 1 is a molecular formula illustrating an inorganic polymer according to a preferred exemplary embodiment of the present invention.

Referring to FIG. 1, M is a transition metal having an oxidation number of 1, X means a halogen element, and CF is a bonding functional group. The bonding functional group has a hydrogen element and an element for hydrogen bonding.

The transition metal includes copper (Cu), manganese (Mn), iron (Fe), cadmium (Cd), cobalt (Co), nickel (Ni), zinc (Zn), mercury (Hg), molybdenum (Mo), titanium (Ti), magnesium (Mg), chromium (Cr) or antimony (Sb).

Further, the halogen element includes fluorine (F), chlorine (Cl), bromine (Br) or iodine (I).

The bonding functional group is a compound having a hydrogen element and an element for hydrogen bonding. The bonding functional group is chemically bonded to the transition metal and forms a hydrogen bond with an adjacent inorganic polymer through the hydrogen element. For this purpose, the bonding functional group needs to have a hydrogen element at the end of the chemical bond. This hydrogen element is bonded to an element such as nitrogen (N), oxygen (O), or fluorine (F), which has a higher electronegativity than a hydrogen atom, and needs to have the ability to hydrogen bond. Further, the bonding functional group has other elements that form hydrogen bonds, and Group 15 elements or Group 16 elements are representative as possible elements. These Group 15 and Group 16 elements have unshared electron pairs, and are chemically bonded to transition metals. Group 15 or Group 16 elements which can be employed in the bonding functional group include oxygen, sulfur, nitrogen, selenium or tellurium.

The hydrogen element of the bonding functional group may form a hydrogen bond with an element for hydrogen bonding or a halogen element of another inorganic polymer. Inorganic polymers are bonded to each other by hydrogen bonds and are formed as an amorphous nanostructure. For example, it is preferred that the bonding functional group is thiourea, urea, selenourea, tellurourea or a thiol compound.

In the inorganic polymer, the transition metal and the halogen element form a main chain, and the bonding functional group bonded to the transition metal forms a side chain. In particular, the transition metal has an oxidation number of +1.

Figure 2:
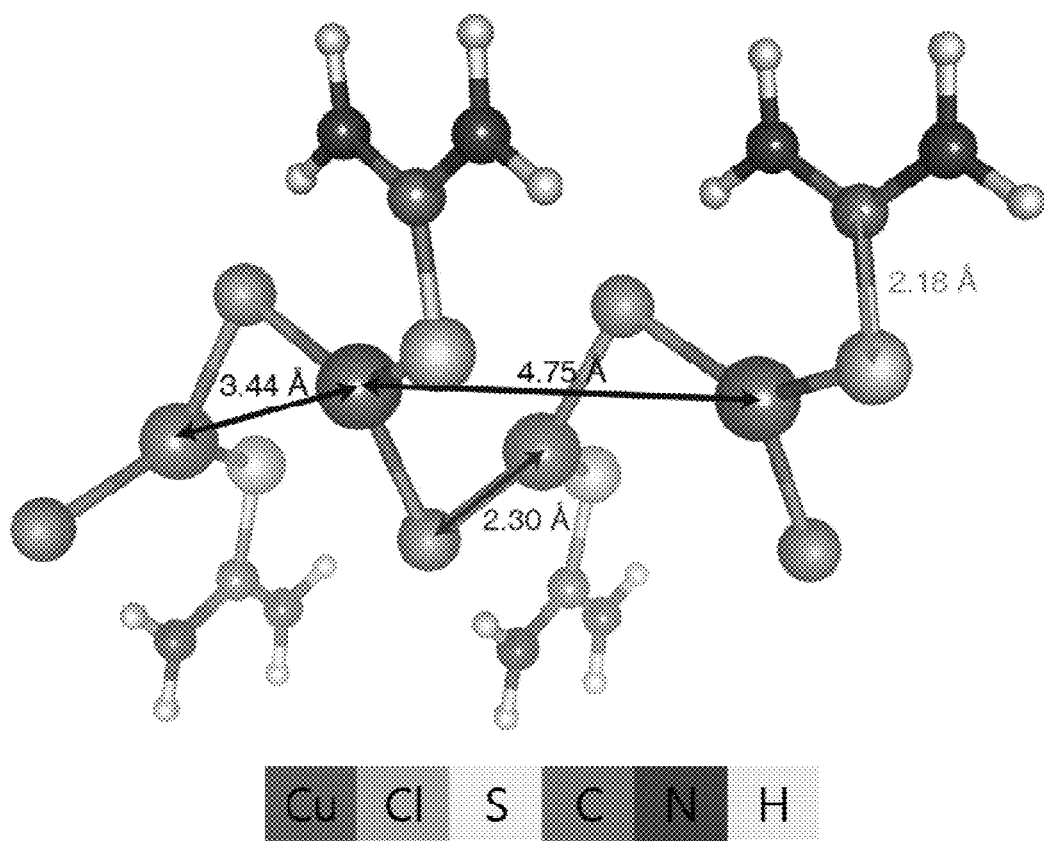
FIG. 2 is a schematic view illustrating the inorganic polymer of FIG. 1 according to a preferred exemplary embodiment of the present invention.

FIG. 2 is a schematic view illustrating the inorganic polymer of FIG. 1 according to a preferred exemplary embodiment of the present invention.

Referring to FIG. 2, an inorganic polymer forms a hydrogen bond with an adjacent inorganic polymer, and forms a nanowire according to the hydrogen bond. The hydrogen bond may be formed between a hydrogen element of a bonding functional group and a halogen element of another inorganic polymer, or may be formed between the hydrogen element of the bonding functional group and a Group 15 element or Group 16 element of the other inorganic polymer. Through the hydrogen bond, the inorganic polymer is bonded to an adjacent inorganic polymer, and forms amorphous nanowires.

When more specifically described, in FIG. 1, Cu is used as the transition metal, Cl is adopted as the halogen element, and thiourea is used as the bonding functional group. Accordingly, the main chain of the inorganic polymer is CuCl, and thiourea is bonded to Cu that is the central metal. Sulfur (S) in thiourea forms a bond with the central metal Cu.

In FIG. 2, two types of hydrogen bonds for forming an amorphous nanostructure are formed. The first is the case where a hydrogen atom of thiourea forming the side chain is hydrogen-bonded to Cl, which is a halogen element in the main chain. The second is the case where a hydrogen atom of thiourea is hydrogen-bonded to sulfur in the side chain. In either case, the inorganic polymers have a predetermined volume and form an aggregate or a certain form by hydrogen bonds. Furthermore, an amorphous nanostructure formed by hydrogen bonds has the form of wires, and may have a form in which bonds between hydrogen-halogen elements and bonds between hydrogen-Group 16 elements and hydrogen-Group 15 elements intermingle.

The amorphous nanostructure is manufactured by the following process.

First, a synthetic solution of a first metal precursor, a bonding functional group, and a polar solvent is prepared.

The first metal precursor includes a transition metal capable of having various oxidation numbers, includes a halogen element, and has a characteristic of being dissolved in a polar solvent. A transition metal which may be introduced includes copper (Cu), manganese (Mn), iron (Fe), cadmium (Cd), cobalt (Co), nickel (Ni), zinc (Zn), mercury (Hg), molybdenum (Mo), titanium (Ti), magnesium (Mg), chromium (Cr) or antimony (Sb). Further, the metal precursor includes the mentioned transition metal, but includes a chloride, a nitrate, a sulfate, an acetate, acetyl acetonate, a formate, a hydroxide, oxide, or a hydrate thereof, which has a halogen element.

The bonding functional group has a hydrogen element and an element for hydrogen bonding, and it is preferred that a bonding functional group is a thiourea, urea, selenourea, tellurourea or a thiol compound. However, since the bonding functional group should have a Group 15 element or a Group 16 element together with a hydrogen element, various selections in addition to the mentioned compounds can be made at the level of those skilled in the art, if needed.

In addition, a polar solvent to be prepared is for dissolving or dispersing the first metal precursor and the bonding functional group. Examples of a polar solvent which may be used include an alcohol-based polar solvent, a glycol-based polar solvent, a polyglycol-based polar solvent or water. Examples of the alcohol-based polar solvent include methanol, ethanol, propanol, butanol, or the like. Furthermore, examples of the polyglycol-based polar solvent include ethylene glycol, diethylene glycol, triethylene glycol, or the like.

Further, a pH adjuster may be added to the polar solvent. Through this, the polarity of a synthetic solution including a first metal precursor, a bonding functional group, and a polar solvent is adjusted. The diameter, length, and the like of a nanostructure to be manufactured are changed by changing the polarity of the synthetic solution, so that various forms of nanostructures may be obtained. The pH adjuster is acidic or basic, and as the pH adjuster, it is possible to use hydrochloric acid, hydrofluoric acid, formic acid, acetic acid, hydrocyanic acid, sulfuric acid, nitric acid, carbonic acid, an amino acid, citric acid, ascorbic acid, potassium hydroxide, lithium hydroxide, sodium hydroxide, barium hydroxide, strontium hydroxide, copper hydroxide, beryllium hydroxide, methoxylated ions, ammonia, amidated ions, methyl anions, cyanide ions, acetic acid anions or formic acid anions.

By the above-described process, a synthetic solution including a first metal precursor, a compound including a bonding functional group, and a polar solvent is formed. In addition, as mentioned, a pH adjuster may be added to the synthetic solution.

Subsequently, a process of manufacturing an amorphous nanostructure using a synthetic solution is performed.

For example, through the mixing, stirring, sonicating, shaking, vibration, agitating or flowing of the synthetic solution, an amorphous nanostructure is manufactured in the synthetic solution.

Further, the reaction temperature in the synthetic solution may be set to a temperature in the range from 0° C. to the boiling point of the polar solvent, and may be in a range of preferably 5° C. to 50° C., more preferably 10° C. to 40° C. Since the above temperature range belongs to room temperature, those skilled in the art can induce a reaction without any temperature limitation.

In this reaction, the oxidation number of the first metal precursor is reduced, and thus has a value of +1, and a main chain of a central metal and a halogen element is formed. That is, a transition metal constituting a first metal precursor in the state before the reaction may have various oxidation numbers, but the transition metal constituting the first metal precursor has an oxidation number of +1 by the reaction and serves as a central metal in an inorganic polymer. In addition, the halogen element included in the first metal precursor is bonded to the transition metal or the central metal to form a main chain of an inorganic polymer. In the process of forming the main chain, some halogen elements which are not bonded to the central metal may break away and be floated in an ionic state in the synthetic solution.

Furthermore, the bonding functional group forms a chemical bond with the central metal. During the bonding process, the bonding functional group donates an unshared electron pair to the central metal. In particular, the bonding functional group has a Group 15 element or a Group 16 element in addition to the hydrogen element, these elements are bonded by donating an unshared electron pair to the central metal, and the hydrogen element forms a hydrogen bond with another inorganic polymer synthesized.

Through this, inorganic polymers are synthesized, and a hydrogen bond is formed between the inorganic polymers to form an amorphous nanostructure. The above-described amorphous nanostructure may be formed of nanowires or spherical nanoparticles.

Subsequently, the formed amorphous nanostructure is mixed with a second metal precursor. Through mixing, the amorphous nanostructure reacts with the second metal precursor and is formed of metal nanoparticles.

The second metal precursor may include at least one selected from the group consisting of a chloride, a fluoride, a bromide, an iodinated product, a nitrate, a nitrite, a sulfate, an acetate, a carbonate, a citrate, a cyanide, a phosphate, acetyl acetonate, a formate, a hydroxide, an oxide, a chlorometallic acid, of the second metal element, and a hydrate thereof.

Further, the second metal element is required to have a higher standard reduction potential than the standard reduction potential of the central metal having an oxidation number of +1.

Through this, metal nanoparticles including the second metal element are formed inside of or on the surface of the amorphous nanostructure. The reaction on the surface of the nanostructure is described by the following Reaction Scheme 1.

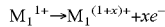

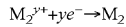  [Reaction Scheme 1]

In Reaction Scheme 1, $M_1$ represents the central metal of the inorganic polymer, and $M_2$ represents the second metal element. Since the second metal element in the chemical formula has a higher reducing power than the central metal, the central metal is dissociated from the main chain with an oxidation number of +2 or higher. In addition, electrons generated by the dissociation of the central metal are bonded to an ionized second metal element, and the ionized second metal element is reduced to a neutral second metal element.

The reduced second metal element is aggregated at a specific position and formed of spherical metal particles. In addition, due to the characteristic of being reduced to an atomic unit, the second metal element may have a single crystal structure.

The second metal element for the above-described reaction is a metal different from the central metal, and has a higher standard reduction potential than the standard reduction potential of the central metal. As the second metal element, most preferably, a material having a high standard reduction potential, such as ruthenium (Ru), rhodium (Rh), palladium (Pd), silver (Ag), osmium (Os), iridium (Ir), platinum (Pt), or gold (Au), is included. In addition, it is preferred that the second metal element includes cobalt (Co), sodium (Na), potassium (K), iron (Fe), cadmium (Cd), nickel (Ni), chromium (Cr), thallium (Tl), rubidium (Rb), zinc (Zn), copper (Cu), manganese (Mn), molybdenum (Mo), indium (In), gallium (Ga), bismuth (Bi), titanium (Ti), lead (Pb), aluminum (Al), magnesium (Mg) or antimony (Sb).

The second metal element tends to be reduced and aggregated in a specific region of the amorphous nanostructure. Furthermore, the second metal element is formed of approximately spherical metal nanoparticles, and has a structural characteristic of a single crystal. It is presumed to be due to the result that the metal material does not take a rapid cooling path in the molten state, and the metal material is formed in atomic units through room temperature synthesis.

For example, when the transition metal is Cu, it is preferred that the second metal element is silver (Ag), gold (Au), platinum (Pt), palladium (Pd), ruthenium (Ru), osmium (Os), iridium (Ir) or rhodium (Rh).

It is preferred that the reaction between the amorphous nanostructure and the second metal precursor is performed in a polar solvent. The used polar solvent is used for dissolving and dispersing the second metal precursor, and is preferably water, an alcohol-based polar solvent, a glycol-based polar solvent or a polyglycol-based polar solvent. The alcohol-based polar solvent includes methanol, ethanol, propanol or butanol, the polyglycol-based polar solvent include ethylene glycol, diethylene glycol, triethylene glycol, or the like, and various substances in addition to the mentioned materials may be used as a solvent as long as the solvent is a polar solvent.

Further, the manufacture of the amorphous nanostructure and the second metal precursor may be performed by the mixing, stirring, sonicating, shaking, vibrating, agitating, flowing or a combination thereof of the polar solvent. By the above method, ultrasmall metal nanoparticles including a second metal element may be simply and rapidly formed by uniformly dispersing an amorphous nanostructure and a precursor containing the second metal element in the solvent and allowing the amorphous nanostructure and the precursor to react with each other.

In addition, second metal precursors may be formed into a plurality of types and ultrasmall metal nanoparticles in the form of an alloy may be formed. That is, second metal precursors including two or more types of metals having a higher standard reduction potential than the central metal may be formed, and alloy nanoparticles in which two or more types of second metal elements are mixed may be formed by mixing and stirring the second metal precursors. Through this, alloys of various metals may be formed in a nano size.

The metal nanoparticles in the form of an alloy include two or more different metal elements, and have different reducing powers among them. In addition, they have a higher standard reduction potential than the central metal of the amorphous nanostructure. Two or more types of second metal precursor ions having different reducing powers are absorbed onto the amorphous nanostructure on an atomic scale. When metal ions at a certain concentration or more are absorbed onto the amorphous nanostructure, these metal ions are simultaneously reduced by the central metal, and simultaneously participate in the nucleation process, so that alloy nanoparticles in which two or more elements are uniformly mixed may be produced. Metal nanoparticles thermodynamically including alloys may be formed in an amorphous state.

Preparation Example 1: Manufacture of Amorphous Nanostructure 25 mg of $CuCl_2$ used as a first metal precursor and 25 mg of a thiourea powder used as a bonding functional group were put into a beaker. 100 ml of ethanol, which is a polar solvent, was put into the beaker. A solution in which the $CuCl_2$, thiourea, and ethanol were mixed was ultrasonically dispersed at room temperature. As a result of the dispersion, amorphous copper-chloride nanowires including S, N, C, and H and having Cu—Cl as a main chain were synthesized within 1 to 2 minutes. The amorphous copper-chloride nanowires may be used for the manufacture of metal nanoparticles.

Figure 3:
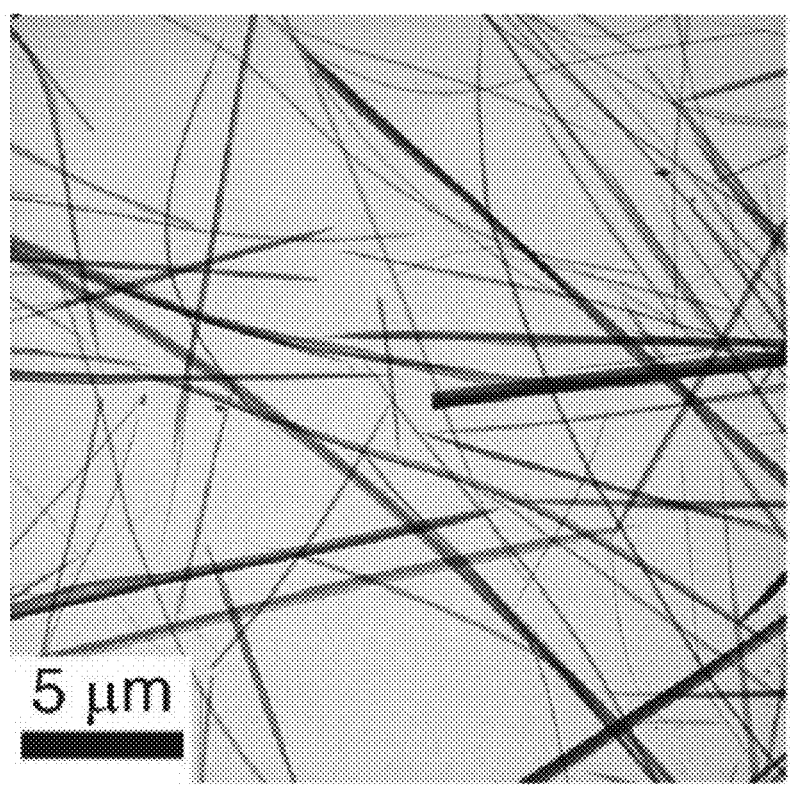
FIGS. 3 and 4 are a TEM image and an EDS mapping image of amorphous nanowires prepared according to Preparation Example 1 of the present invention.
Figure 4:
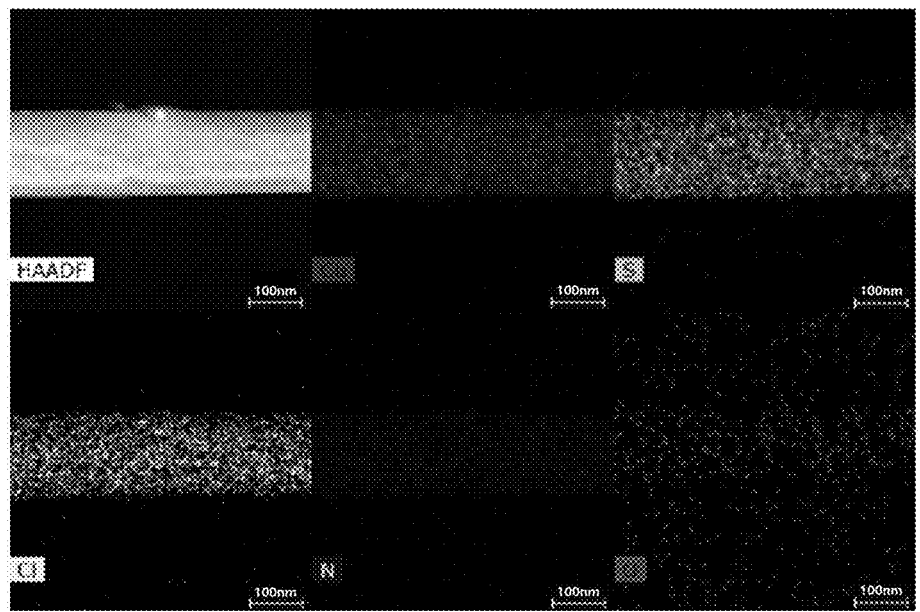

FIGS. 3 and 4 are a TEM image and an EDS mapping image of amorphous nanowires prepared according to Preparation Example 1 of the present invention.

Referring to FIGS. 3 and 4, amorphous copper-chloride nanowires appear. Further, when the manufactured amorphous nanowires were measured by EDS, the atomic composition ratio of Cu:S:N:Cl was found to be 1:1:2:1. Cu and Cl are derived from the first metal precursor, these atoms form a main chain of an inorganic polymer, S and N are derived from thiourea, and S is used as an element for hydrogen bonding. In addition, a hydrogen atom bonded to nitrogen forms a hydrogen bond with an adjacent inorganic polymer to form amorphous nanowires. Furthermore, as illustrated in FIG. 2, it can be confirmed that Cu, S, N and Cl are uniformly distributed throughout the nanowires, and that it is in an amorphous state where the crystallized portion does not appear.

Preparation Example 2: Manufacture of Various Types of Crystalline Metal Nanoparticles Each second metal precursor is prepared. The prepared second metal precursors include a second metal element having a higher standard reduction potential than Cu, which is a central metal of the amorphous nanowires of Preparation Example 1. Each second metal precursor is ruthenium (□) chloride hydrate, a rhodium (□) nitrate solution, a palladium (□) chloride solution, silver nitrate, osmium (□) chloride trihydrate, iridium (□) chloride hydrate, a chloroplatinic acid solution or a gold (□) chloride solution.

Each of these secondary metal precursors is dissolved in 200 ml of ethanol, which is a polar solvent, at room temperature for 3 minutes. After each ethanol solution including the second metal precursors is placed in a beaker including the amorphous copper-chloride nanowires produced in Preparation Example 1, crystalline metal nanoparticles are manufactured by stirring the resulting mixture for several minutes.

The molar mass of the amorphous copper-chloride nanowires is 175.12 g/mol, and 1.2 mole of each second metal precursor per mole of amorphous nanowires is introduced. Further, the amorphous nanowires are formed at a yield of 70 wt %. When the amount of the second metal precursor is taken as a specific example, the amorphous nanowires made of 25 mg of $CuCl_2$ and 25 mg of thiourea in Preparation Example 1 is produced in an amount of 50 mg×0.7 (yield)=35 mg in 100 ml of ethanol. Since the molar mass of the amorphous nanowires is 175.12 g/mol, 0.2 mmol of the amorphous nanowires produced in Preparation Example 1 are formed. That is, a metal precursor for making nanoparticles is used by dissolving 0.2×1.2=0.24 mmol of metal atoms in 200 ml of ethanol.

Figure 5:
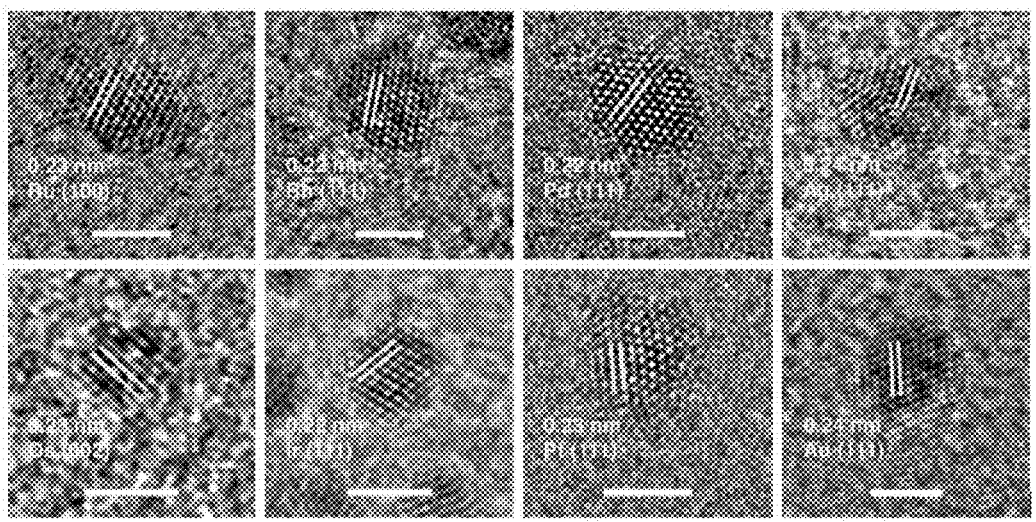
FIG. 5 is a set of images of metal nanoparticles manufactured according to Preparation Example 2 of the present invention.

FIG. 5 is a set of images of metal nanoparticles manufactured according to Preparation Example 2 of the present invention.

Referring to FIG. 5, metal nanoparticles of Ru, Rh, Pd, Ag, Os, Ir, Pt and Au are shown. The metal nanoparticles exhibit a crystal phase and have a diameter of approximately 2 nm to 2.5 nm. Further, a (100), (111), or (002) plane is shown on the high resolution transmission electron microscopy (HRTEM) image. The scale of 0.22 nm to 0.24 nm shown in each image represents a lattice constant in the corresponding plane. Although all the nanoparticles have an ultrasmall size, the atomic plane is clearly visible, which indicates that the formed nanoparticles are single crystals having high crystallinity. In addition, each ultrasmall nanoparticle has a uniform size of about 2 nm.

Preparation Example 3: Manufacture 1 of Alloy Nanoparticles

In the present Preparation Example, alloy nanoparticles including two types of metals are formed. For this purpose, a rhodium (□) nitrate solution, a palladium (□) chloride solution, a chloroplatinic acid solution, osmium (□) chloride trihydrate, and a gold (□) chloride solution, which are second metal precursor, are each suitably dissolved in 200 ml of ethanol for a desired alloy type at room temperature. A mixed solution is formed by mixing a solution including two types of second metal precursors. The composition of the alloy nanoparticles manufactured may vary depending on the type of mixed solution formed.

Furthermore, the amorphous copper-chloride nanowires of Preparation Example 1 are put into the formed mixed solution and stirred. Through this, various types of alloy nanoparticles may be obtained, and each alloy nanoparticle is provided in a pattern in which two types of metal elements are mixed.

Figure 6:
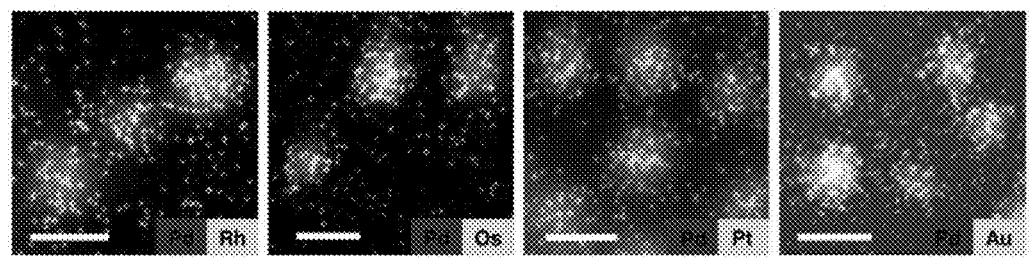
FIG. 6 is a high-resolution STEM image and EDS mapping image of alloy nanoparticles according to Preparation Example 3 of the present invention.

FIG. 6 is a high-resolution STEM image and EDS mapping image of alloy nanoparticles according to Preparation Example 3 of the present invention.

Referring to FIG. 6, a palladium (II) chloride solution and a rhodium (III) nitrate solution are dissolved at a molar ratio of 1:2 in 200 ml ethanol in order to form Pd/Rh alloy nanoparticles. Further, a palladium (□) chloride solution and osmium (□) chloride trihydrate are dissolved at a molar ratio of 1:2 in 200 ml of ethanol in order to form Pd/Os alloy nanoparticles. A palladium(□) chloride solution and a chloroplatinic acid solution are dissolved at a molar ratio of 1:1 in 200 ml of ethanol in order to form Pd/Pt alloy nanoparticles. In addition, a palladium (□) chloride solution and a gold (□) chloride solution are dissolved at a molar ratio of 3:1 in 200 ml of ethanol in order to form Pd/Au alloy nanoparticles.

200 ml of each of the four types of metal mixed solutions is mixed with the amorphous nanowires dispersed in 100 ml of ethanol and prepared in Preparation Example 1 and the resulting mixture is stirred. Through this, Pd/Rh, Pd/Os, Pd/Pt and Pt/Au alloy nanoparticles can be manufactured. From FIG. 6, it can be seen that each of the alloy nanoparticles has a composition proportional to the amount of second metal precursor used. That is, when the mixed solution was formed by mixing the second metal precursor, micro alloy nanoparticles having a composition of Pd:Rh=1:2, Pd:Os=1:2, Pd:Pt=1:1, and Pd:Au=3:1 in proportion to the molar ratio of the introduced second metal precursor are produced. As can be seen from FIG. 6, it can be seen that these two types of second metal elements are well mixed in the particles. A total amount of the second metal precursor (a sum of the amounts of two second metal precursors) was added at 1.2 mol per mol of the amorphous copper-chloride nanowires.

The alloy nanoparticles manufactured in the present preparation example have a uniform size of about 2 nm.

Preparation Example 4: Manufacture 2 of Alloy Nanoparticles

In the present preparation example, alloy nanoparticles are formed by mixing three different types of second metal elements. That is, nanoparticles have a form of alloys of three types of metal elements.

First, in order to manufacture alloy nanoparticles including three types of metal elements, as the second metal precursor including three types of metal elements, a rhodium (□) nitrate solution, a palladium (□) chloride solution, and a gold (□) chloride solution were dissolved while being stirred at a molar ratio of 1:1:1 in 200 ml of ethanol at room temperature for 3 minutes. 200 ml of this solution was mixed and stirred with a solution in which the amorphous nanowires provided in Preparation Example 1 were dispersed in 100 ml of ethanol. Pd/Rh/Au alloy nanoparticles are manufactured through a few minutes of stirring.

Figure 7:
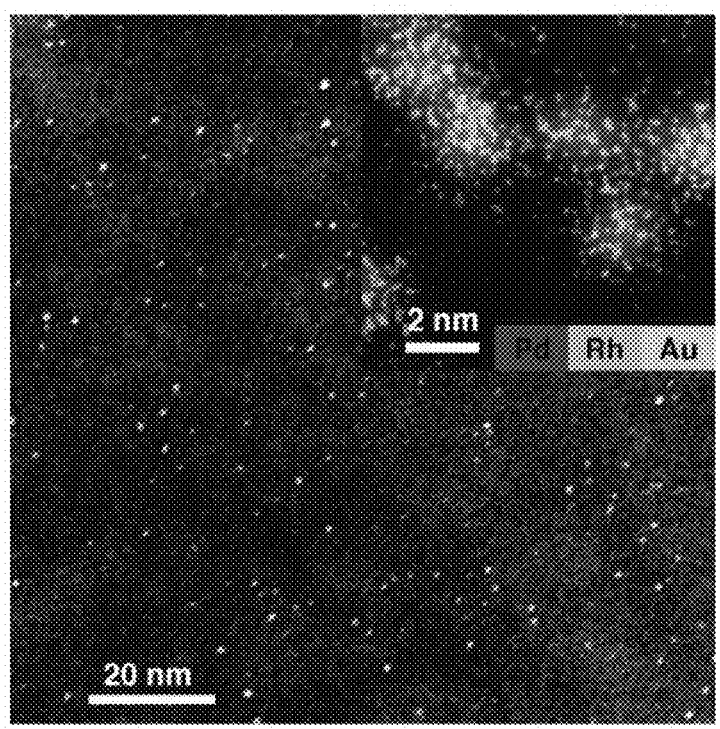
FIG. 7 is an STEM image and EDS mapping image of Pd/Rh/Au alloy nanoparticles manufactured according to Preparation Example 4 of the present invention.

FIG. 7 is an STEM image and EDS mapping image of Pd/Rh/Au alloy nanoparticles manufactured according to Preparation Example 4 of the present invention.

Referring to FIG. 7, alloy nanoparticles including three elements in which Rh/Pd/Au has a uniform molar ratio composition of 1:1:1 are formed. Further, produced nanoparticles have a uniform size of about 2 nm to about 2.5 nm. A total amount of the second metal precursor (a sum of the amounts of three types of second metal precursors) was added at 1.2 mol per mol of the amorphous copper-chloride nanowires.

Preparation Example 5: Manufacture 3 of Alloy Nanoparticles

In the present preparation example, alloy nanoparticles in which four different types of metal elements are mixed are disclosed. As second metal precursors, a rhodium (□) nitrate solution, a palladium (□) chloride solution, a chloroplatinic acid solution, and a gold (□) chloride solution are respectively dissolved in 200 ml of ethanol by being stirred at room temperature for 3 minutes. After a solution of a second metal precursor including Rh, Pd, Pt, and Au dissolved at a ratio of 1:1:1:1 in ethanol is mixed with 100 ml of a solution including the amorphous copper-chloride nanowires provided in Preparation Example 1, alloy nanoparticles including four types of metal elements are formed by stirring the resulting mixture for several minutes.

Figure 8:
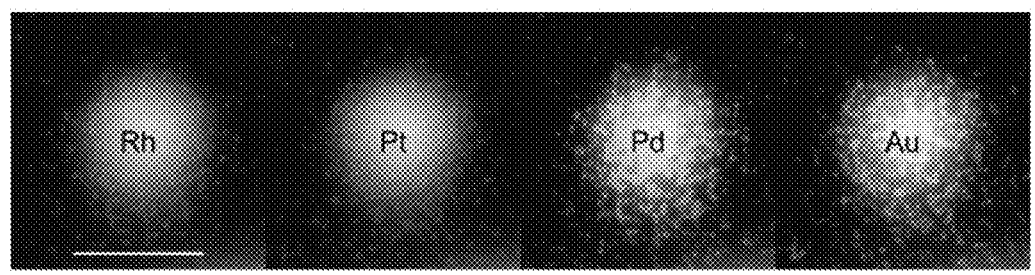
FIG. 8 is an STEM image and EDS mapping image of Rh/Pt/Pd/Au alloy nanoparticles manufactured according to Preparation Example 5 of the present invention.

FIG. 8 is an STEM image and EDS mapping image of Rh/Pt/Pd/Au alloy nanoparticles manufactured according to Preparation Example 5 of the present invention.

Referring to FIG. 8, alloy nanoparticles including four metal elements in which Rh/Pt/Pd/Au had a uniform molar ratio composition of 1:1:1:1 were produced. A total amount of the second metal precursors (a sum of the amounts of four second metal precursors) was added at 1.2 mol per mol of the copper-chloride polymer nanostructure. It can be seen that the particles manufactured in Preparation Example 5 have a uniform size of approximately 2 nm to 2.5 nm.

Preparation Example 6: Manufacture 4 of Alloy Nanoparticles

In the present preparation example, alloy nanoparticles in which five different types of metal elements are mixed are disclosed. As second metal precursors, a rhodium (□) nitrate solution, a palladium (□) chloride solution, a chloroplatinic acid solution, iridium (□) chloride hydrate, and a gold (□) chloride solution are respectively dissolved in 200 ml of ethanol by being stirred at room temperature for 3 minutes. After a solution of a second metal precursor including Rh, Pd, Pt, Ir and Au dissolved at a ratio of 1:1:1:1:1 in ethanol is mixed with 100 ml of a solution including the amorphous copper-chloride nanowires provided in Preparation Example 1, alloy nanoparticles including five types of metal elements are formed by stirring the resulting mixture for several minutes.

Figure 9:
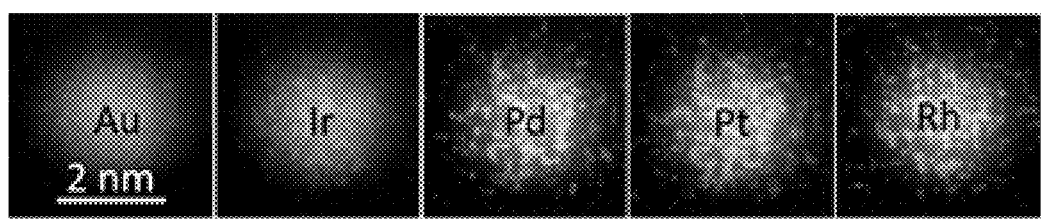
FIG. 9 is an STEM image and EDS mapping image of Au/Ir/Pd/Pt/Rh alloy nanoparticles manufactured according to Preparation Example 6 of the present invention.

FIG. 9 is an STEM image and EDS mapping image of Rh/Pt/Pd/Au/Ir alloy nanoparticles manufactured according to Preparation Example 5 of the present invention.

Referring to FIG. 9, alloy nanoparticles including five metal elements in which Rh/Pt/Pd/Au/Ir had a uniform molar ratio composition of 1:1:1:1:1 were produced. A total amount of the second metal precursors (a sum of the amounts of four second metal precursors) was added at 1.2 mol per mol of the copper-chloride polymer nanostructure. It can be seen that the particles manufactured in Preparation Example 5 have a uniform size of approximately 2 nm to 2.5 nm.

Preparation Example 7: Rh/Au Alloy Nanoparticles with Adjusted Composition

A rhodium (□) nitrate solution and a gold (□) chloride solution were dissolved at a molar ratio of 8:2, 6:4, 4:6, and 2:8 in 200 ml of ethanol. After this solution was mixed with 100 ml of a solution including the amorphous copper-chloride nanowires provided in Preparation Example 1, Rh/Au alloy nanoparticles were manufactured by stirring the resulting mixture for several minutes. It could be seen that the composition of final nanoparticles is determined in proportion to the amount of precursor used, meaning that the composition of nanoparticles could be freely adjusted.

Figure 10:
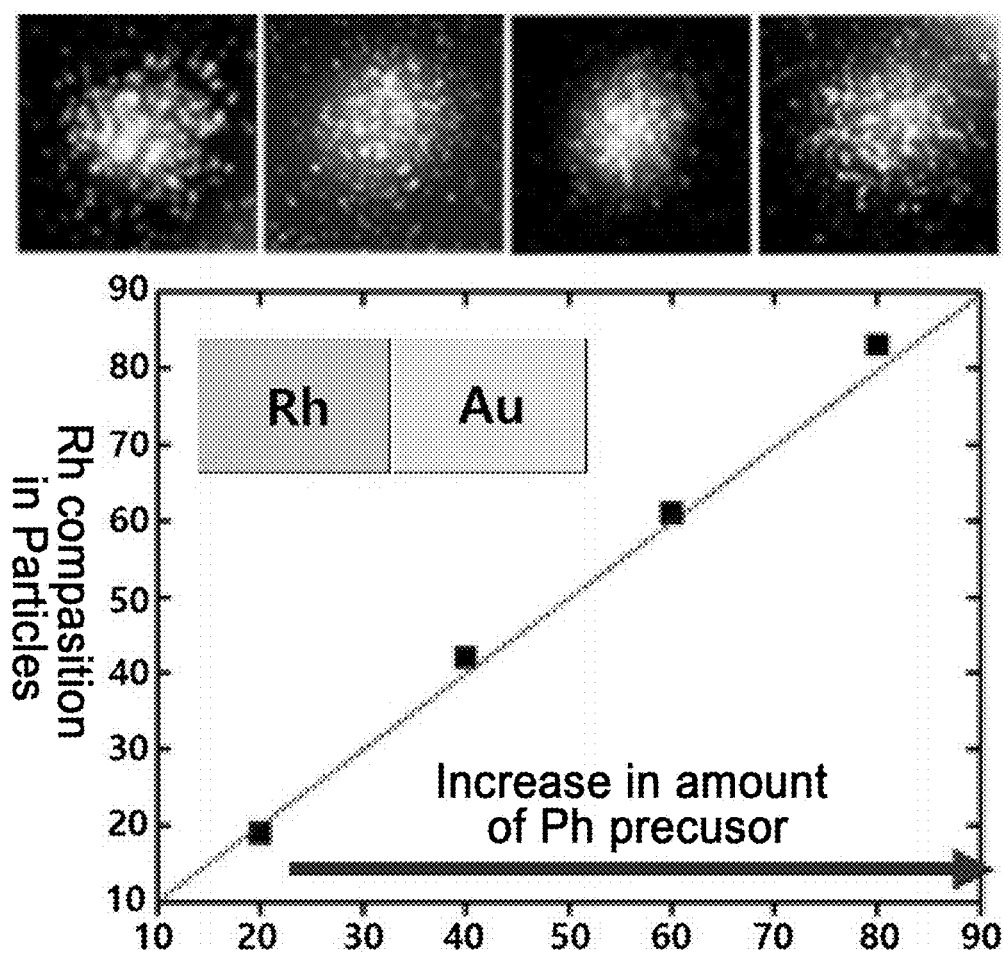
FIG. 10 is an STEM image and EDS mapping image of composition-adjusted Rh/Au alloy nanoparticles manufactured according to Preparation Example 7 of the present invention. A graph showing the composition of alloy nanoparticles according to the amount of precursor used is shown.

A related graph is shown in FIG. 10. Further, STEM images and EDS mapping images for each composition are shown.

Preparation Example 8: Changes in Shape Depending on Use of Second Metal Precursor Relative to Amorphous Copper-Chloride Nanowires As a second metal element, Au is selected. A second metal precursor to be used is a gold (□) chloride solution, and the second metal precursor is mixed with 200 ml of ethanol. In addition, the amorphous copper-chloride nanowires prepared in Preparation Example 1 are mixed therewith. A gold (□) chloride solution is mixed at a molar ratio of (a) 1/4, (b) 1/2, and (c) 3/4 relative to the amorphous nanowires, and is stirred and dissolved for 3 minutes.

Figure 11:
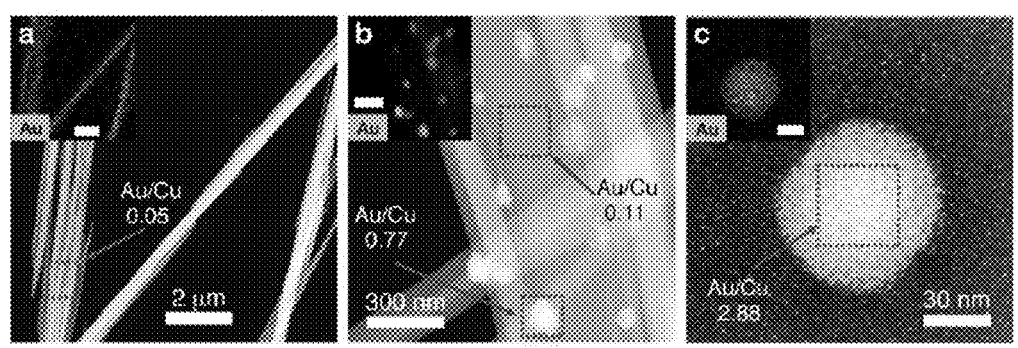
FIG. 11 is an STEM image and EDS mapping image showing changes in the shape of nanowires depending on the amount of Au precursor used relative to amorphous copper-chloride nanowires according to Preparation Example 8 of the present invention.

FIG. 11 is an STEM image and EDS mapping image showing changes in the shape of the Au/Cu alloy depending on the amount of Au precursor used relative to amorphous copper-chloride nanowires according to Preparation Example 8 of the present invention.

Referring to FIG. 11, it can be confirmed that when an Au precursor, which is a second metal element, is added at a molar ratio of 1/4 relative to the amorphous copper-chloride nanowires, the Au element is distributed at an atomic level in a separated space on the surface of the amorphous copper-chloride nanowires or inorganic polymers constituting the nanowires. That is, it can be seen that when the amount of second metal precursor added is small, the phenomenon in which Au metal atoms are precipitated or formed as spherical nanoparticles does not occur. In this case, the amount of Au adsorbed onto the amorphous copper-chloride nanowires and the amount of Cu in the amorphous nanowires are compared, and the molar ratio of Au to Cu is 0.05:1.

Furthermore, it can be confirmed that when the second metal precursor is introduced at a molar ratio of 1/2 relative to the amorphous copper-chloride nanowires, a portion of the amorphous copper-chloride nanowires are decomposed. This occurs in the process in which Cu having an oxidation number of +1 is oxidized while having an oxidation number of +2, and Au having an oxidation number of +3 absorbs electrons generated from the oxidation of Cu to be converted into Au metal nanoparticles. The amorphous copper-chloride nanowires are formed of particles having a diameter of 30 nm to 100 nm through the decomposition process. It goes without saying that undecomposed amorphous copper-chloride nanowires also appear in a form of intermingling. A molar ratio of Au to Cu in the undecomposed amorphous copper-chloride nanowires is 0.11:1, and a molar ratio of Au to Cu in a partially decomposed amorphous copper-chloride nanostructure and formed as 30 nm to 100 nm particles is 0.77:1.

Further, when the second metal precursor is introduced at a molar ratio of 3/4 relative to the amorphous copper-chloride nanowires, the amorphous copper-chloride nanowires are completely decomposed, only a copper-chloride amorphous nanostructure having a size of 30 nm to 100 nm is formed. The nanostructure to be formed has an approximately spherical shape. In this case, a molar ratio of Au to Cu is 2.88:1.

That is, the amorphous nanowires maintain the shape depending on the amount of second metal precursor introduced, and can be developed from a mode of adsorbing the second metal element to a mode of completely decomposing the second metal element. That is, when the amount of second metal precursor introduced is insignificant, the second metal element appears in the form of being adsorbed onto the surface or in voids of the amorphous nanowires, and when the amount second metal precursor introduced is gradually increased, the amorphous nanowires are decomposed due to the oxidation reaction of the central metal constituting the amorphous nanowires. An aspect in which the central metal and the introduced second metal element are mutually agglomerated by decomposition appears.

If the amount of second metal precursor introduced exceeds the critical point, the amorphous nanowires are completely decomposed, and metal nanoparticles including the second metal element having a size of several nm are formed.

Preparation Example 9: Manufacture of Metal Oxide Nanostructure

In the present preparation example, nanoneedles of metal oxide are formed by appropriately selecting a second metal element.

Figure 12:
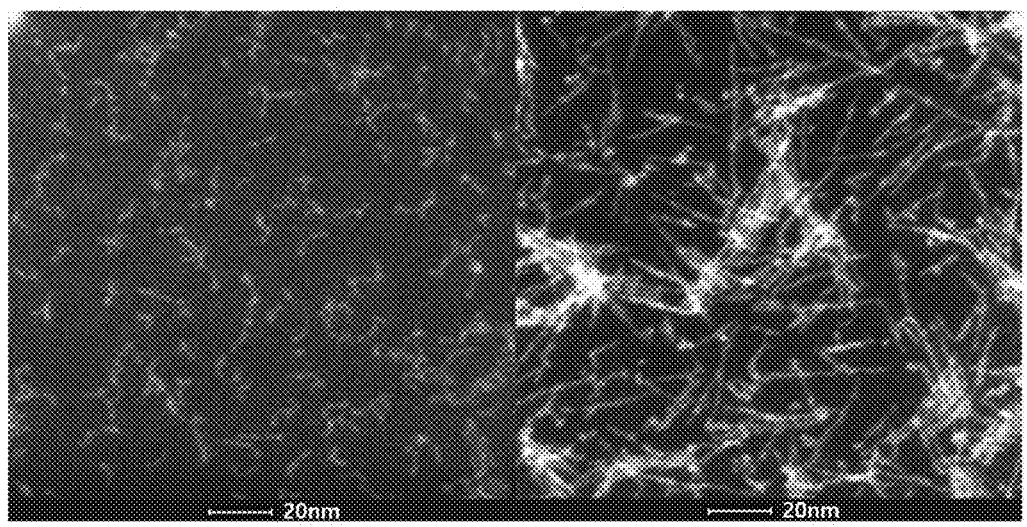
FIG. 12 is an STEM image illustrating the shapes of $Fe_3O_4$ nanoneedles according to Preparation Example 9 of the present invention.

FIG. 12 is an STEM image illustrating the shapes of $Fe_3O_4$ nanoneedles according to Preparation Example 9 of the present invention.

Referring to FIG. 12, 81 mg and 162 mg of $FeCl_3$ are each dissolved using $FeCl_3$ as a second metal precursor in 200 ml of ethanol. Thereafter, $Fe_3O_4$ nanoparticles and $Fe_3O_4$ nanoneedles having a diameter of 1 nm to 2 nm are formed by mixing 200 ml of an ethanol solution of the second metal precursor dissolved in 100 ml of ethanol including the copper-chloride nanowires formed in Preparation Example 1, and stirring the resulting mixture.

The image on the left side in FIG. 12 illustrates an image of $Fe_3O_4$ formed after mixing 200 ml of ethanol in which 81 mg of $FeCl_3$ is dissolved with 200 ml of ethanol including copper-chloride nanowires. From the above image, it can be seen that $Fe_3O_4$ does not have a perfect needle shape, and exhibits a shape in which nanoparticles are attached to each other in one direction.

The image on the right side in FIG. 12 illustrates an image of $Fe_3O_4$ formed after mixing 200 ml of ethanol in which 162 mg of $FeCl_3$ is dissolved with 200 ml of ethanol in which copper-chloride nanowires are formed. In the above image, $Fe_3O_4$ exhibits a nano-sized needle shape. That is, when a sufficient amount of the second metal precursor is supplied, Fe is formed in a manner in which +2 and +3 oxidation numbers intermingle at the +3 oxidation number. That is, since $Fe_3O_4$ is $FeO-Fe_2O_3$, an oxidation number of +2 and an oxidation number of +3 are present in one molecule.

That is, it can be seen that a central metal Cu having an initial oxidation number of +1 has an oxidation number of +2 and donates electrons, and Fe partially reduces the oxidation number from 3+ to 2+ by the donated electrons to form nanoneedles of $Fe_3O_4$ by a reduction action. The reduction of Fe from 2+ to 1+ or 0 does not occur because the mentioned change in oxidation number is smaller than the standard reduction potential at which the central metal $Cu^{2+}$ is changed into $Cu^{2+}$. For this reason, the nanostructure is formed in the form of an oxide of $Fe_3O_4$ rather than Fe particles. Here, oxygen is supplied from a solvent such as ethanol.

In various preparation examples of the present invention described above, it can be confirmed that second metal elements, which are different from a central metal of an inorganic polymer forming an amorphous nanostructure and have a higher standard reduction potential than the central metal, are formed as uniform particles having a size of 2 nm to 2.5 nm. Further, when metal nanoparticles are formed, a second metal precursor needs to be mixed at a certain concentration or more. When the concentration is insufficient, the second metal element cannot be formed into approximately spherical particles, and appears as if the second metal element adheres to or floats on the surface or in internal voids of the amorphous nanostructure. Further, the second metal element is mixed with the central metal and formed as spherical particles having a size of 30 nm or more.

In addition, in the present invention, metal nanoparticles having an alloy structure can be formed by mixing two or more second metal precursors having higher standard reduction potentials than the central metal. Through this, metal nanoparticles having various functions can be formed with a uniform size. Metal nanoparticles or alloy nanoparticles with a nanosize have various industrial uses. That is, various electrical or chemical properties that cannot be realized with micro-sized metal particles or metal particles having a size of tens of nanometers can be realized, and when this is applied to various environments, a very high industrial value can be obtained.

The invention claimed is:

1. A method for manufacturing metal nanoparticles, the method comprising:
   preparing an amorphous nanostructure of an inorganic polymer of Chemical Formula 1 that is hydrogen-bonded;
   mixing the amorphous nanostructure with a second metal precursor comprising a second metal element having a higher standard reduction potential than a metal of the inorganic polymer; and
   forming metal nanoparticles comprising the second metal element on the surface of the amorphous nanostructure

[Chemical Formula 1]

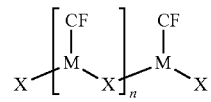

wherein in Chemical Formula 1, M represents a transition metal, X represents a halogen, CF represents a functional group comprising hydrogen and oxygen, sulfur, nitrogen, selenium, tellurium, and n represents a number of repeat units and has a value of 10 to 500,000.

2. The method of claim 1, wherein in the forming of the metal nanoparticles, the metal of the inorganic polymer increases from an oxidation number of +1 to reduce the second metal element.

3. The method of claim 2, wherein in the forming of the metal nanoparticles the inorganic polymer dissociates as the oxidation number of the metal of the inorganic polymer increases.

4. The method of claim 3, wherein the metal nanoparticles have a diameter of 2 nm to 2.5 nm and are formed by reduction of the metal element and dissociation of the inorganic polymer.

5. The method of claim 1, wherein the preparing of the amorphous nanostructure
of the inorganic polymer of Chemical Formula 1 comprises mixing a first metal precursor, the bonding functional group, and a polar solvent.

6. The method of claim 5, wherein the first metal precursor comprises at least one of copper (Cu), manganese (Mn), iron (Fe), cadmium (Cd), cobalt (Co), nickel (Ni), zinc (Zn), mercury (Hg), molybdenum (Mo), titanium (Ti), magnesium (Mg), chromium (Cr), or antimony (Sb).

7. The method of claim 1, wherein the functional group is thiourea, urea, selenourea, tellurourea or a thiol compound.

8. The method of claim 1, wherein the second metal precursor comprises at least one selected from the group consisting of a chloride, a fluoride, a bromide, an iodinated product, a nitrate, a nitrite, a sulfate, an acetate, a carbonate, a citrate, a cyanide, a phosphate, acetyl acetonate, a formate, a hydroxide, an oxide, a chlorometallic acid, of the second metal element, and a hydrate thereof.

9. The method of claim 1, wherein M is copper, the halogen is chlorine, the bonding functional group is thiourea, and the second metal element comprises silver (Ag), gold (Au), platinum (Pt), palladium (Pd), ruthenium (Ru), osmium (Os), iridium (Ir), or rhodium (Rh).

10. The method of claim 1, wherein M is copper, and the second metal element is iron (Fe), and the metal nanoparticles have a nanoneedle shape including $Fe_3O_4$.

11. The method of claim 1, wherein
the metal nanoparticles have a single crystal phase.

12. The method of claim 1, wherein in the mixing of the amorphous nanostructure with the second metal precursor,
two or more different second metal precursors are present, and the two or more second metal precursors have different second metals each having a higher standard reduction potential than the metal of the inorganic polymer.

13. The method of claim 12, wherein the metal nanoparticles are an amorphous alloy including two or more different metals.

* * * * *